(12) United States Patent
Chrysanthous (10) Patent No.: US 8,801,214 B2
(45) Date of Patent: Aug. 12, 2014

(54) BRACKET SYSTEM FOR SOLAR-POWERED LANTERNS AND METHOD OF USING SAME

(75) Inventor: Van Chrysanthous, Enderby (CA)

(73) Assignee: Solarklip Enterprises Ltd., Salmon Arm (CA)

( * ) Notice: Subject to any disclaimer, the term of this patent is extended or adjusted under 35 U.S.C. 154(b) by 310 days.

(21) Appl. No.: 13/373,753

(22) Filed: Nov. 29, 2011

(65) Prior Publication Data

US 2013/0135848 A1    May 30, 2013

(51) Int. Cl.
*F21L 4/00*    (2006.01)

(52) U.S. Cl.
USPC ........... 362/191; 362/198; 362/253; 362/382; 362/388; 362/396

(58) Field of Classification Search
USPC ............ 362/109, 191, 197, 198, 249.01, 253, 362/382, 388, 396
See application file for complete search history.

(56) References Cited

U.S. PATENT DOCUMENTS

| | | | |
|---|---|---|---|
| D177,955 S | 6/1956 | Arbogast et al. | |
| 2,896,896 A | 7/1959 | Revzin et al. | |
| 3,596,859 A | 8/1971 | MacDonald | |
| 3,908,948 A | 9/1975 | Hawthorne | |
| 4,121,798 A | 10/1978 | Schumacher et al. | |
| 4,133,509 A | 1/1979 | Kalbow et al. | |
| D271,831 S | 12/1983 | McGain | |
| 4,895,329 A | 1/1990 | Sloan | |
| 4,903,929 A | 2/1990 | Hoffman | |
| D319,575 S | 9/1991 | Young | |
| 5,118,059 A | 6/1992 | Mainer | |
| 5,249,108 A * | 9/1993 | Gary | 362/388 |
| 5,288,047 A | 2/1994 | Pan | |
| D356,492 S | 3/1995 | Adams | |
| 5,460,346 A | 10/1995 | Hirsch | |
| D364,555 S | 11/1995 | Neiert | |
| D369,957 S | 5/1996 | Blanton | |
| 5,544,031 A | 8/1996 | Blanton | |
| D376,535 S | 12/1996 | Gary et al. | |
| 5,772,166 A | 6/1998 | Adams | |
| 5,788,201 A | 8/1998 | Hardison | |
| 5,806,903 A | 9/1998 | George | |
| 5,857,658 A | 1/1999 | Niemiec | |
| 5,984,251 A | 11/1999 | Davis | |
| D472,653 S | 4/2003 | Northrop | |
| 6,581,896 B1 | 6/2003 | Olexovitch | |
| 7,178,777 B1 | 2/2007 | Banker | |
| D552,463 S | 10/2007 | French et al. | |
| D554,927 S | 11/2007 | Smith | |
| 7,341,230 B2 | 3/2008 | Beaudry | |
| 7,618,015 B2 | 11/2009 | Jahnz | |

* cited by examiner

*Primary Examiner* — Meghan Dunwiddie (74) *Attorney, Agent, or Firm* — Antony C. Edwards (57) ABSTRACT

Mounting brackets hold solar-powered lanterns such as used for garden and pathway lighting. The lanterns make useful hand held lighting if they are releasably mounted in the mounting bracket where they will get sunshine for charging and where a user will often need to use a lantern. They may be mounted for example beside doors or on fence or gate posts, or on walls such as the outside walls of buildings or enclosures such as storage sheds, metal storage containers, etc. A user has no trouble locating the closest lantern after dark as the lanterns automatically turn their lighting elements on when it gets dark. The user may then merely pull the lantern by its stalk, which now serves as the lantern handle, and the resilient tongs of the mounting bracket releases the lantern.

18 Claims, 9 Drawing Sheets

BRACKET SYSTEM FOR SOLAR-POWERED LANTERNS AND METHOD OF USING SAME

FIELD OF THE INVENTION

This invention relates to wall-mountable brackets for holding implements in particular to a system for providing portable hand-held lighting which includes resilient amounting brackets for holding the stalk of a solar-powered solar-rechargeable lantern of the kind conventionally provided for mounting into the ground in gardens or alongside pathways, and to the method of using in the system the combination of such mounting brackets and lanterns.

BACKGROUND OF THE INVENTION

Applicant is aware of U.S. design Pat. No. 177,955 which is issued Jun. 12, 1956 to Arbogast for a Bracket for a Flashlight or the Like which discloses an ornamental design for a bracket for a flashlight.

Applicant is also aware of U.S. Pat. No. 7,178,777 which issued. Feb. 20, 2007 to Banker for an Adjustable Tension Clip and Method of Use, wherein Banker discloses an adjustable tension clip assembly used for retaining a tool such as a welding torch. The tension clip assembly is engaged with a clamp which is able to be removably mounted onto a surface, wherein the clamp maybe a common c-clamp. The tension clip assembly has a pair of mirror-image resilient clip members positioned in spaced-apart parallel alignment. The tool is held within the resilient clip members.

Applicant is also aware of U.S. Pat. No. 4,903,929 which issued Feb. 27, 1990 to Hoffman for a Portable Apparatus for Holding Objects wherein Hoffman describes a holding device which clamps onto fixtures such as furniture, counter tops trees, fences, etc. and holds pole-shaped objects. An open, curved, resilient member holds the pole-shaped object. A c-clamp mounts the resilient member to the fixture.

Applicant is also aware of U.S. Pat. No. 4,895,329 which issued Jan. 23, 1992 Sloan for a Flashlight Clamp, wherein Sloan teaches a clamp for holding a flashlight in position while removably securing the flashlight to a support. The clamp includes a u-shaped retaining member and a threaded connector cooperative with the retaining member to enable adjustment of gripping tension on the flashlight body. Tension in u-shaped arms that retain the flashlight by a clamping action is adjustable without need for manual manipulation through bending or otherwise, wherein the threaded connector maybe a bolt or screw whereby a turning movement results in tension adjustment of the retaining arms. As the threaded connector is turned the retaining arms are brought closer together increasing the tension on the body of the flashlight being held.

Applicant is also aware of U.S. Pat. No. 3,908,948 which issued Sep. 30, 1975 to Hawthorne for an Adjustable Container Support wherein Hawthorne discloses a bracket for removably hanging items on a wall for use with association with peg-board type storage units. A pair of spaced ears at the top of a bracket support member secure to a peg-board wall. The bracket includes a hanger member having a pair of spaced, article clamping arms to support a container.

Applicant is also aware of U.S. Pat. No. 2,896,896 which issued Jul. 28, 1959 Revzin for an Accessory Clamp wherein Revzin teaches a portable clamp assembly for attaching lamps and other accessories to fixed objects such as work benches, tables etc. a c-clamp is provided wherein the upper portion of the c-clamp pivots relative to the lower portion of the c-clamp upon adjustment of a screw by rotation of its associated control knob, and wherein a clamping ring is mounted to the upper portion of the c-clamp for clamping therein a tubular accessory support.

SUMMARY OF THE INVENTION

The mounting bracket according to one aspect of the present invention holds lanterns which are commercially sold as solar-powered garden and pathway lighting which use light emitting diodes (LEDs). Such lanterns are often designed to be stuck into the ground on spikes which extend downwardly from the stalk of the lantern. These lanterns typically have quite wide "heads", i.e. the upper part which contains the LEDs or other light elements, which heads may be in the order of two to eight inches across and are mounted on the upper end of the elongate stalks. The stalks may have having diameters in the range of ⅜ inch to 1 inch approximately. An example of such a lantern is the NOMA™ Eco-Bright Metal. LED Garden Light supplied by NOMA Lites Ltd of Weybridge, United Kingdom. According to the present invention these ground lanterns also make useful hand held lighting if they are releasably mounted where they will get sunshine for charging and where a user will often need to use a lantern. They may be mounted for example beside doors or on fence or gate posts, or on walls such as the outside walls of buildings or enclosures such as storage sheds, metal storage containers, etc. The lanterns also decorative when elevated and mounted at, for example, eye level, on a releasable holder bracket.

Thus, according to another aspect of the present invention, the lanterns lend a decorative appearance to the front of the building or enclosure or gate, or along the fence line demarking a user's property, etc. A user has no trouble locating the closest lantern after dark as the lanterns automatically turn their LEDs or other light elements on when it gets dark. The user may then merely pull the lantern by its stalk, which now serves as the lantern handle, and the mounting bracket releases the lantern because the pinchers or tongs on the distal end of the bracket, that is, the end farthest from the vertical mounting surface on which the bracket is mounted, is resilient, for example being made of resilient polyurethane. The base of the mounting bracket is also resilient so that for example the bracket may be mounted on a tree and will not crack if mounted over a knot, etc.

For over-size diameter lantern stalks, the ends of the tongs are flared outwardly so that a rubber band or other tether may be looped over the distal ends of the tongs to mechanically close over the opening into the tongs. Because the head of the lantern is relatively wide, advantageously the throat of the tongs angles the stalk of the lantern upwardly and outwardly so that the head of the lantern clears the vertical mounting surface on which the bracket and lantern are mounted.

In summary, the present invention may be characterized in one aspect as both a system and a method for providing portable hand-held lighting.

The system includes a mounting bracket having a base at a base end of the bracket and a pair of resiliently operable tongs at an opposite distal end of the bracket, distal from the base end. A shank extends between the base and distal ends of the bracket. The base lies substantially in a base plane. The pair of tongs define a throat having an opening between ends of the pair of tongs. The throat opening opens and closes as the pair of resiliently operable tongs resiliently open and close to expand and contract a cross-sectional area of the throat as the stalk of a lantern is mounted onto or removed from the throat of the bracket. The throat has a bore axis passing substantially centroidally there through. The bore axis is inclined relative to the base plane, for example at ten to fifteen degrees from the vertical.

When in use, the system also includes a solar-powered hand-held lantern having a solar powered lighting head at an upper end of the lantern and a rigid elongate stalk at a lower end of the lantern, wherein the lantern stalk is mounted under the lantern head so as to extend substantially linearly downwardly from the head and wherein the head has a diameter that is greater than a diameter of the stalk. The diameter of the stalk may be substantially in the range of ⅜ inch to one inch. The stalk has a longitudinal axis extending substantially centroidally along and through the stalk and the head of the lantern.

The stalk is releasably mountable into the throat of the mounting bracket through the opening into a mounted position wherein the longitudinal axis of the lantern is substantially co-linear with the bore axis of the throat so as to position the lantern. The stalk is manually removable from the throat by pulling of the stalk through the opening as the throat opening said resiliently opens and closes.

The base is adapted for mounting to a rigid substantially vertical mounting surface so as to dispose said bore axis upwardly and outwardly inclined from the base plane. That is, when the base is mounted to the vertical mounting surface so that the base plane is adjacent and substantially parallel to the vertical mounting surface, the bore axis is inclined upwardly and outwardly.

Advantageously the system includes a plurality of the mounting brackets and a corresponding plurality of the lanterns. The plurality of the mounting brackets are adapted for mounting to vertical mounting surfaces chosen from the group of locations comprising: a tree, a post, a pole, a door, a gate, a door frame, a railing, a wall.

Further advantageously the vertical mounting surfaces are at an elevated location for ease of grasping of the stalks by the user and for ease of pulling of the stalks by the user.

The pairs of tongs or the shank, or the base, or all of those components may be made of resilient material such as 90 A durometer polyurethane.

A method for providing portable hand-held lighting includes:
(a) Providing a mounting bracket as described above for use in the system, Providing a solar powered lantern as described above for use in the system,
(b) releasably mounting the stalk into the throat through the opening into a mounted position wherein the longitudinal axis of the stalk is substantially co-linear with the bore axis of the throat, and wherein the stalk is manually removable from the throat by pulling of the stalk away from the mounting bracket and through the opening in the pair of tongs as the opening the resiliently opens and closes,
(c) Mounting the base of the bracket to a rigid substantially vertical mounting surface so as to dispose the bore axis upwardly and outwardly the inclined from the base plane and so that the base plane is adjacent and substantially parallel to the vertical mounting surface.

Preferably a plurality of the mounting brackets and a corresponding plurality of the lanterns are provided, and the plurality of the mounting brackets mounted to vertical mounting surfaces, where surfaces are chosen from the group of locations comprising: a tree, a post, a pole, a door, a gate, a door frame, a railing, a wall, and wherein the mounting locations are exterior locations chosen to position upper ends of the heads of the plurality of the lanterns so that they are exposed to sunlight on a sunny day.

Further advantageously the base's of the plurality of the mounting brackets are mounted at elevated locations for ease of grasping of the stalks by the user and for ease of pulling of the stalks by the user.

BRIEF DESCRIPTION OF THE DRAWINGS

FIG. 1b is, in side elevation view, the mounting bracket of FIG. 1a with a solar-powered hand-held lantern mounted therein which has a much wider diameter head as compared to the lantern of FIG. 1a.

FIG. 4b is, in side elevation view, the mounting bracket of FIG. 4a.

FIG. 4c is, in plan view, the mounting bracket of FIG. 4a.

FIG. 4d is, in end elevation view, the tong end of the mounting bracket of FIG. 4a.

FIG. 8b is, in side elevation view, the mounting bracket of FIG. 8a.

FIG. 9b is the view of FIG. 9a with the tongs resiliently closed to clamp a small diameter lantern stalk.

FIG. 9d is, in rear perspective view, the mounting bracket of FIG. 9a.

DETAILED DESCRIPTION OF EMBODIMENTS OF THE INVENTION

Figure 1:
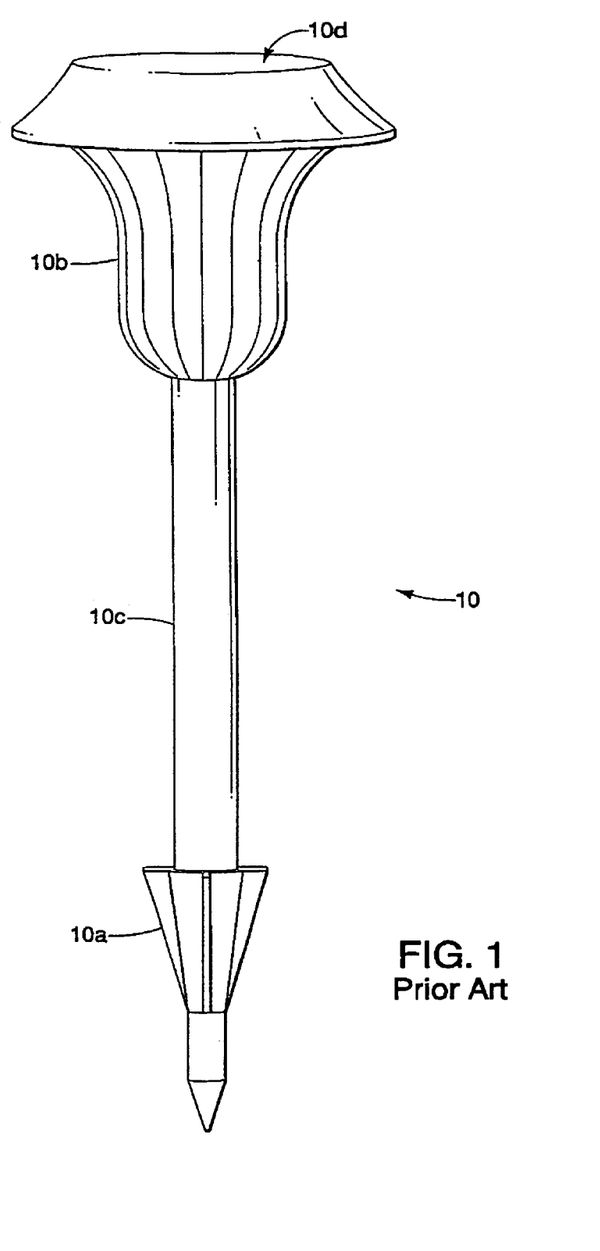
FIG. 1 is, in front elevation view, a prior art garden and pathway solar-powered lantern.

As stated above, solar-powered rechargeable garden lights which, are intended for mounting into the ground for decorative use in gardens and for illumination of pathways, are commercially available. One example sold by NOMA™ lights ltd is the Eco-Bright™ metal LED garden light such as seen in FIG. 1, referred to herein generically as lantern 10. Such solar powered garden and pathway lanterns are designed to be stuck into the ground, typically on a spike 10a. They typically have a head 10b which contains LED lights. The head 10b is mounted on top of an elongate stalk 10c. The stalk 10c is of significantly smaller diameter than the lantern head 10b. As an example, the lantern head of conventional solar-powered pathway lighting lanterns may have a diameter in the order of 4-8 inches, and the stalk may have a diameter of substantially ⅜ of an inch to 1¼ inches. The lanterns solar panel 10d is typically mounted across the top of the lantern head.

Applicant has discovered that such solar-powered garden and pathway lighting lanterns make useful hand held lanterns, and especially so if the lanterns are releasably mounted adjacent to locations where a user will often need to use a hand held lantern, and wherein they are releasably mounted for example using the resilient mounting bracket 12 better described below, and where the lanterns will be positioned with their solar panels, for recharging their solar-powered rechargeable batteries, directed at the sun for at least part of the day on a sunny day. In this way, the lanterns will, as they are designed to do, keep themselves recharged during the day and then automatically turn on when it becomes dark.

Figure 2:
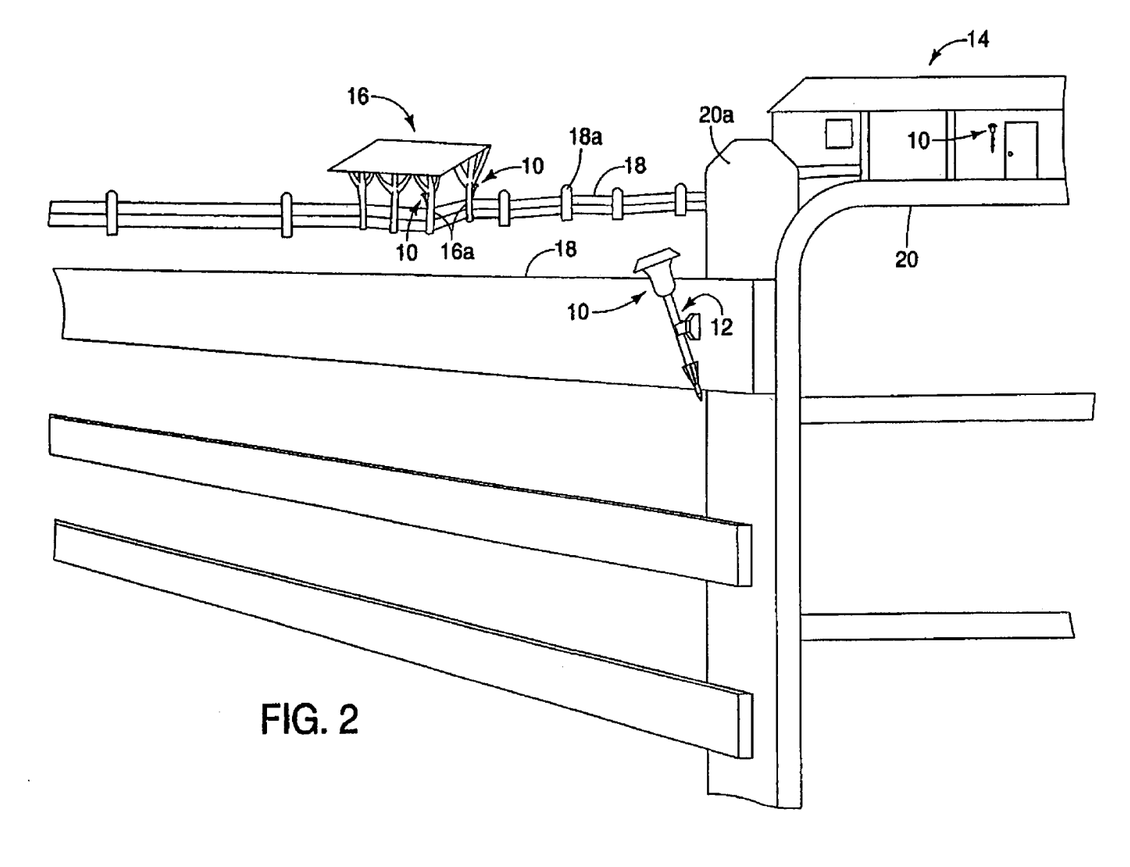
FIG. 2 is, in partial cutaway perspective view, a fence around a residential property showing the use of the system according to one embodiment of the present invention to provide portable hand-held lighting at useful locations around the property.
Figure 3:
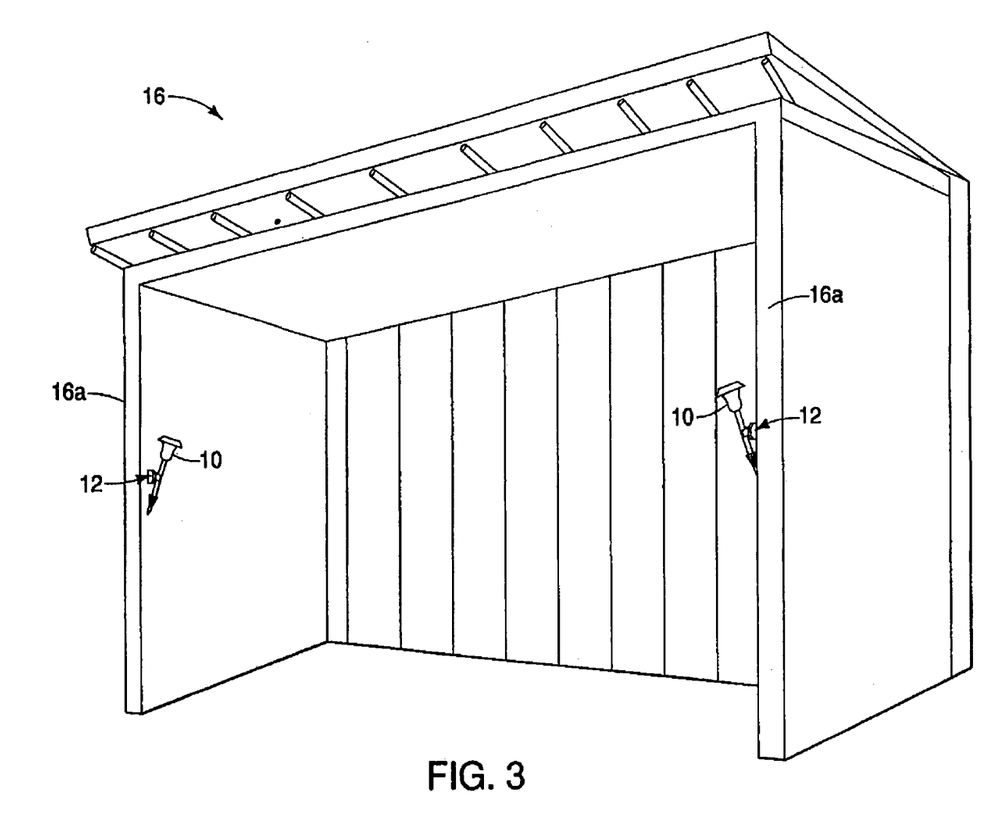
FIG. 3 is, in perspective to view, a shed showing the solar-powered hand-held lighting system according to one aspect of the present invention installed in the front opening of a shed.

Consequently, as seen in FIGS. 2 and 3, when lanterns 10 are releasably mounted in mounting bracket 12, for example to or adjacent to exterior doors 14a to a house 14, or to or adjacent to the exterior vertical supports 16a (such as poles, posts, frame members, etc) of a barn or shed (or to the fences 18 or gate 20 themselves), or when the lanterns are mounted to or adjacent to fence posts 18a or gate posts 20a, in the dark a user will be able to locate a lantern which is lit up and which is positioned to cast it's light where needed, for example on a latch or locking mechanism of a door 14a or gate 20. Because the lantern 10 is releasably mounted, it may be held by the user grasping the stalk 10c and removed from the resilient mounting bracket 12 so the lantern 10 may be carried into a dark enclosure, or carried while the user is moving across dark terrain. When the user has finished with the lantern 10, the lantern 10 may be simply returned to the resilient bracket 12 and left there until needed the next time.

Figure 1A:
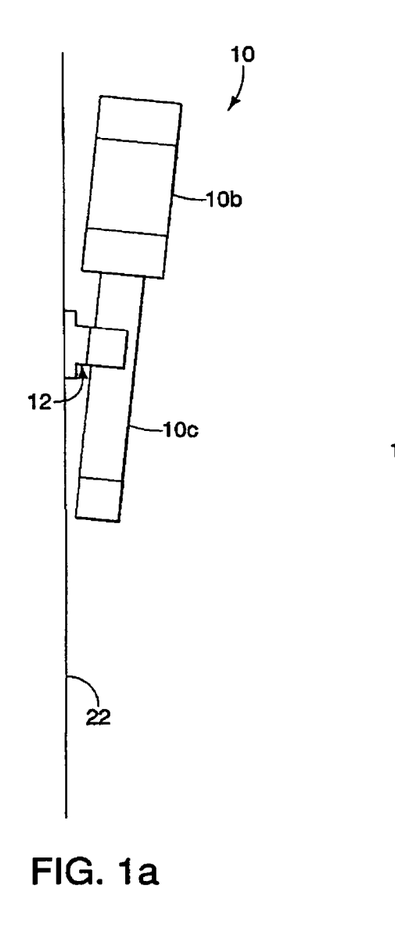
FIG. 1a is, in side elevation view, a solar-powered hand held-lantern mounted into a mounting bracket which is mounted to a rigid vertical surface, wherein the lantern has a relatively narrow diameter head as compared to the diameter of the stalk of the lantern.
Figure 1B:
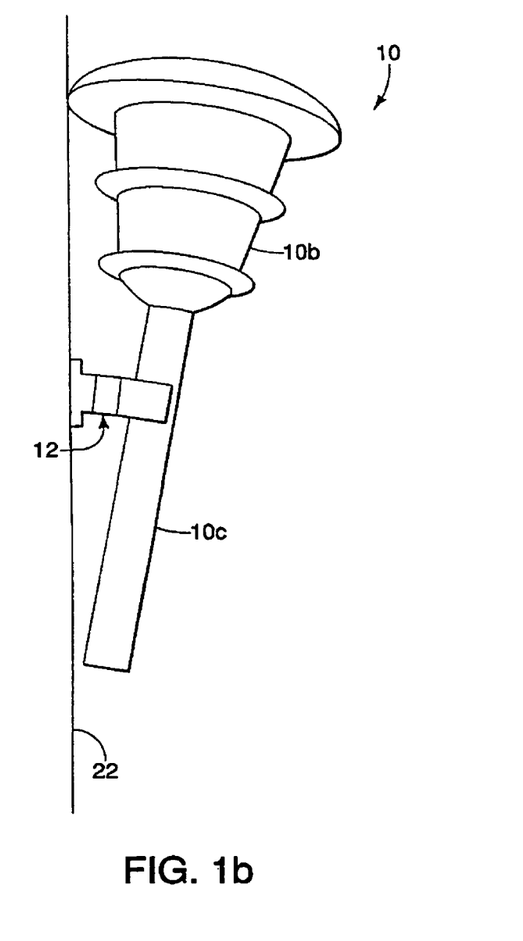

In FIGS. 1a and 1b, other examples of conventional solar powered garden and pathway lights are shown mounted in a resilient holder 12 which is mounted to a rigid vertical surface 22. Examples are mentioned above of useful vertical surfaces 22 to which the mounting bracket 12 may be mounted, although these are not intended to be limiting. Thus as stated above, resilient brackets 12 may be mounted to posts which include fence posts 18a, gate posts 20a, and support beams or members 16a which define the opening to a shed 16. Mounting brackets 12, although shown mounted adjacent the door 14a to house 14 may also be mounted to or adjacent to doors on other forms of buildings such as garages, shops, sheds, barns, or on fixed mobile temporary shelters such as steel containers, campers, or on larger vehicles or vessels, etc, or on trees or other substantional fixtures. Because mounting bracket 12 is made of resilient material better described below, the base 12a of mounting bracket 12 may be mounted to irregular surfaces such as tree trunks. Base 12a is mounted to vertical surfaces by means of threaded fasteners such as screws (not shown) mounted through corresponding apertures in base 12a. Because the base 12a is resilient, mounting of the base to an irregular vertical surface 22 such as a tree trunk will not typically crack base 12a and will allow the mounting bracket 12 to be used in association with, when mounted on, surfaces also having different curvatures such as fence posts having a narrow diameter.

Mounting bracket 12 includes base 12a, shank 12b, and tongs 12c. Advantageously, the entirety of mounting bracket 12 is made from a resilient material having rubber-like properties so that not only does the base conform to a vertical surface which is irregular, but the tongs 12c resiliently open to accept into the throat 12d of the tongs the stalk 10a of lantern 10, where stalk 10c may have a diameter in range between for example ¼ inch to 1 inch and still be accommodated resilient tongs 12c.

Figure 4A:
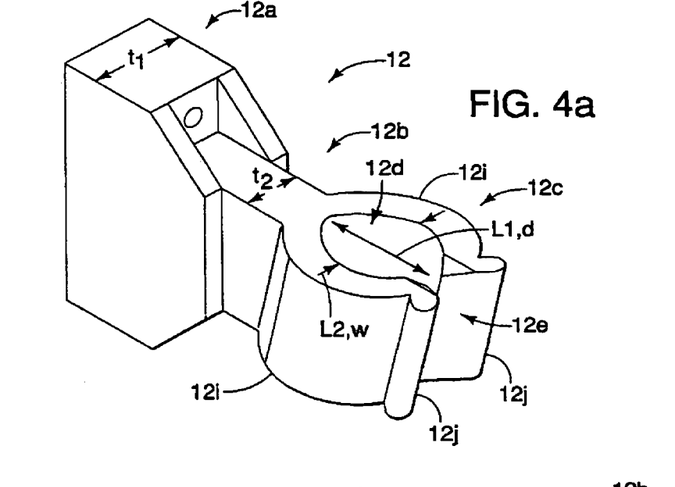
FIG. 4a is, in perspective view, the resilient mounting bracket according to one embodiment.
Figure 4B:
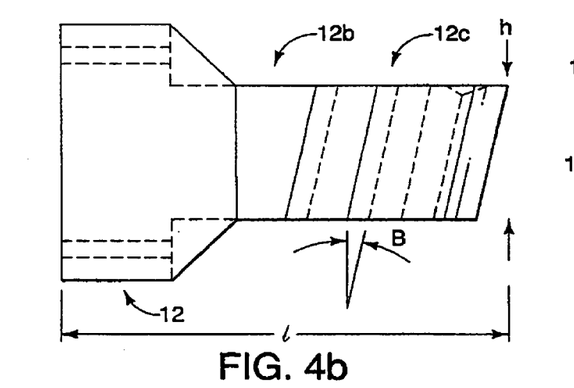
Figure 4C:
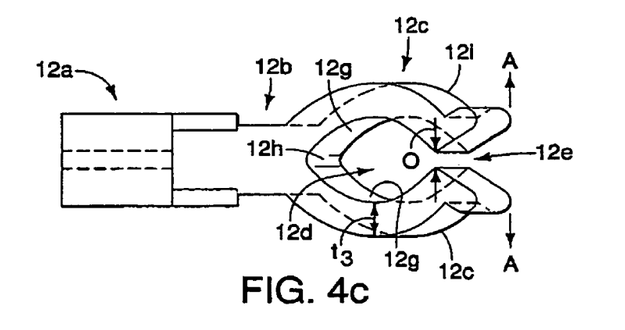
Figure 4D:
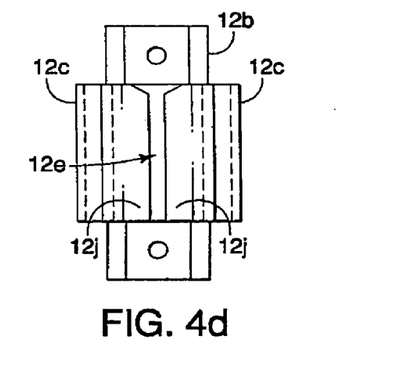

Throat 12d maybe circular. The opening 12e into throat 12d maybe an opening along the circumference of a circle defined by the throat. Advantageously, however, and as illustrated throat 12d is non-circular. Throat 12d has along axis L1 which is longer than its lateral axis L2. Tongs 12c will accommodate a somewhat wider range of stalk diameters if the throat is non-circular as described below; that is, will accommodate wider diameters than if the throat is merely circular in horizontal cross-section. As seen in FIGS. 4a-4c the shape of the cross section of throat 12d may be described as an ogive, although other non-circular shapes such as ovals, ellipses, parabolas may also work. The use of the illustrated ogive for the cross sectional shape of throat 12d provides gripping surfaces 12g which are in opposed facing relation laterally spaced across from one another across the width of the throat. The stalk 10c of the lantern 10 when mounted in the tongs 12c is primarily gripped by the opposed facing interior side surfaces 12g of the tongs. The interior vertex 12h of the throat is at the vertex of the ogive and is typically not in contact with the stalk of the lantern when the stalk is held by the tongs so as to be mounted within the throat 12d. The vertex 12h allows the individual pair of tong arms 12i to separate further in direction A from one another than, in the applicant's experience, is possible where the throat is merely circular in cross section. This allows the throat to accommodate the widest diameter lantern stalk of which applicant is aware, and in particular an approximately 1 inch diameter lantern stalk, when the dimensions of mounting bracket 12 are in the order of:

Height (h): approximately ¼ inches
Length (l): approximately 3 inches
Depth (d): approximately ¼ inch
Throat width (w) (axis L2): approximately ⅝ inch
Throat opening diameter (o): approximately ¼ inch
Base thickness t1: approximately 1 inch
Shank thickness t2 approximately ½ inches
Individual tong thickness t3: approximately ¼ inch
Mounting inclination angle B: approximately 10-15 degrees In one embodiment, mounting bracket 12 may be made of 90 A durometer polyurethane.

Conventional garden and pathway lighting lanterns typically have a lantern head 10b which is wider in diameter than the diameter of the corresponding stalk 10c. For example, to applicant's knowledge the above mentioned NOMA™ lantern 10 has an 8 inch diameter lantern head 10b and an approximately ¾ inch diameter stalk 10c. Inclining the angle B at which the stalk 10c is held in the mounting bracket tongs 12c, apart from lending a decorative look to the lanterns held in the mounting brackets, also inclines the head 10b of the lantern outwardly from the vertical surface 22 to which the base 12a of the mounting bracket is mounted. For a length l of approximately three inches, a stalk inclination angle B of approximately 12 degrees is sufficient to provide clearance for the wider diameter head so it doesn't contact the vertical mounting surface 22 of the post, building. If the stalk is insufficiently long, or the mounting bracket shank is in insufficiently long, or the inclination angle from the vertical is insufficiently small, the lantern head 10b may interfere with the vertical mounting surface 22 when the stalk 10c is mounted into the tongs 12c of the mounting bracket. Thus for example, where the length l is approximately 3 inches, the stalk may be in the order of 8-12 inches in length, not including the ground spike 10d typically provided for driving the stalk into the ground, and the inclination angle B may be in the order of 12 degrees.

If length l is longer than 3 inches, then the base 12a may have to be thicker or otherwise more rugged so as to support the increased torque on the base due to the longer moment arm of the shank (given that lanterns 10 may weigh in the order of a pound or two each).

The conventional garden and pathway lighting lanterns of which the applicant is aware have the solar panel 10d for recharging the lantern mounted in the uppermost surface of the top of the lantern head 10b so as to expose the solar panel 10d upwardly to sunlight when the lantern is installed with the stalk 10c vertically in the ground. To the applicants knowledge the solar panel is mounted on top of the lantern head to maximize the sunlight intensity on the solar panel to thereby most quickly recharge the lantern's battery when the sun is shining. The problem with mounting lanterns 10 to, for example, the walls of buildings or other vertical surfaces 22 which are underneath the eaves of a roof, is that the eaves or roof overhang will cast a shadow down the wall. When the sun is directly overhead the eaves of roof overhang will prevent sunlight from shining directly down the length of the wall. Thus if the lantern is mounted vertically and closely adjacent to the wall, the solar panel on the top of the lantern will often be in shadow under the eaves and especially will b in shadow when the sun is most intense, i.e. directly above the building. Inclining the head 10b of the lantern outwardly from the wall 22 orients the solar panel 12d of the lantern more directly towards the sun the sun will be in its position to shining directly onto the lantern That is from the obstruction of the eaves and overhang. This then provides for most efficient charging of the lantern's batteries, that is, when the solar panels 12d are at approximately right angles to the incoming sunlight angling in to strike the lantern under the eaves. The solar panels are at right angles to the sunlight when the stalks are inclined outwardly and approximately angle B, or at least are brought more closely to such right angles.

A further advantage of inclining the lantern's stalks from the vertical so as to expose the lantern's head's outwardly from the vertical support surface 22, is that the lower-most end of the stalk, whether or not the ground mounting spike 10a is installed into the base of the stalk, is brought into closer proximity to the vertical support surface 22. This is advantageous where the lantern is of a larger size and therefore heavier and in particular when the lantern head 10b is larger and heavier than that of other smaller lanterns 10. For such larger lanterns, when the head 10b is inclined for more efficient battery charging as stated above, an increased rotational moment is exerted by the lantern 10 on the tongs 12c, and an increased rotational moment is also exerted on the mounting bracket because of the moment arm of the shank. In the event that the stalk 10c begins to rotate out from between the grip of the tongs 12c of the mounting bracket, the lower end of the stalk will rotate inwardly towards the vertical support 22 and engage against the vertical support 22 thereby preventing further rotation of the lantern stalk in the tongs of the mounting bracket. This may prevent the lantern head from rotating any further outwardly from the tongs of the mounting bracket and thus may prevent the lantern from falling.

Figures 5, 6:
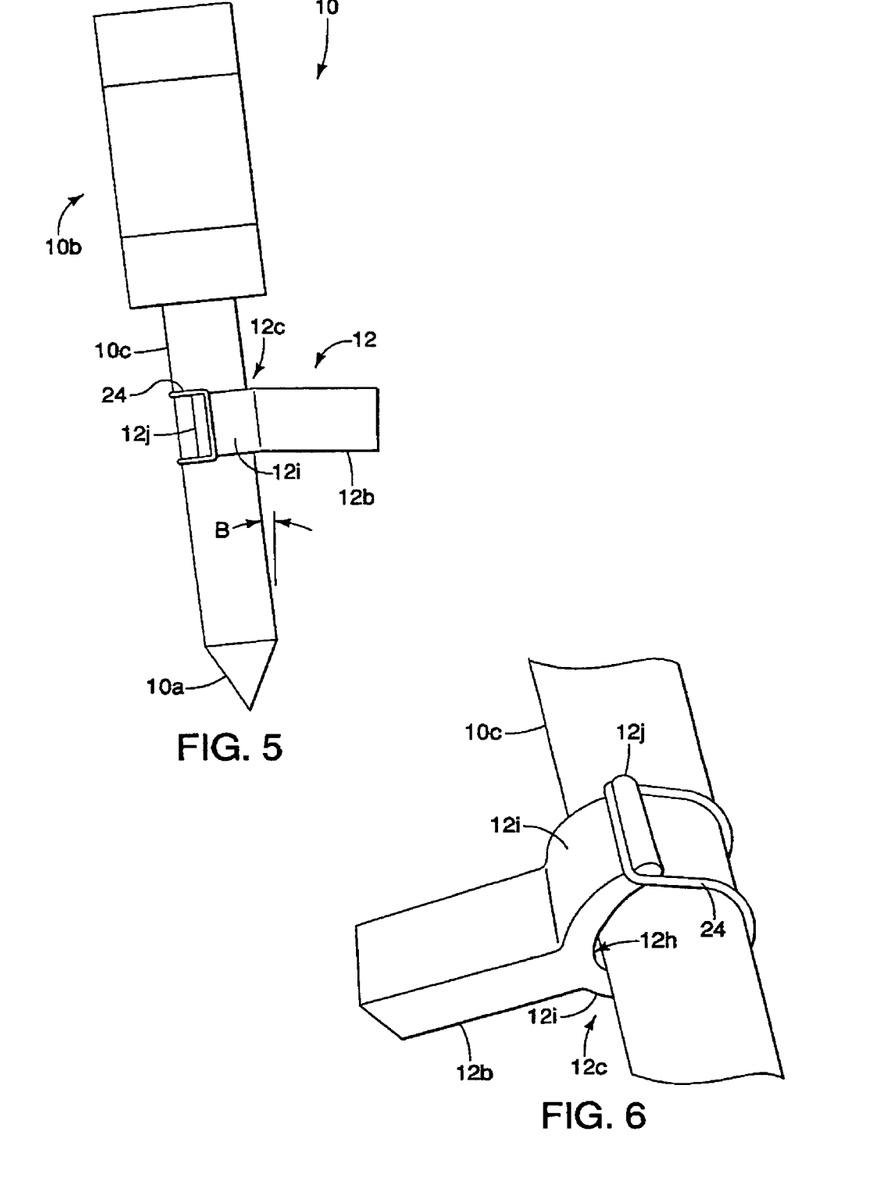
FIG. 5 is, in side elevation view, one solar-powered hand-held lantern releasably mounted into the mounting bracket according to one embodiment.
FIG. 6 is, in partially cut away perspective view, the mounting bracket of FIG. 5 mounted to the stalk of a lantern.
Figure 7:
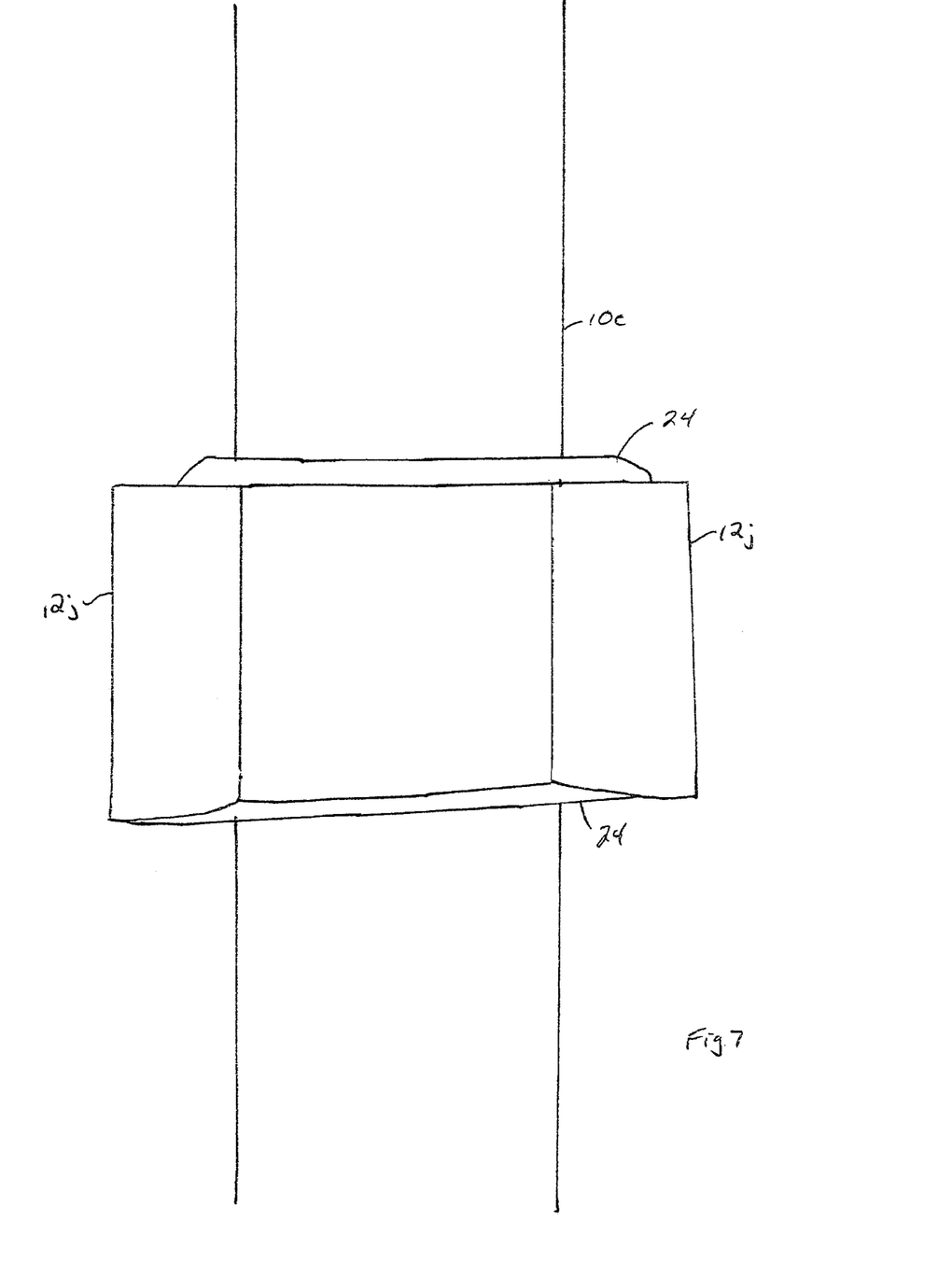
FIG. 7 is, in partially cut away end elevation view, the mounting bracket of FIG. 6.
Figure 8A:
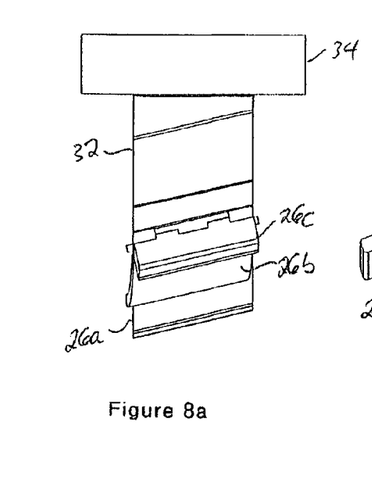
FIG. 8a is, in rear perspective view, a mounting bracket according to an alternative embodiment shown partially closed such as for holding a small diameter lantern stalk.
Figure 8B:
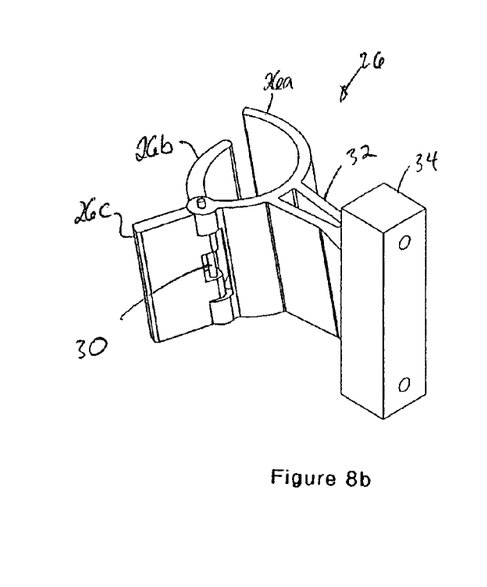
Figure 8C:
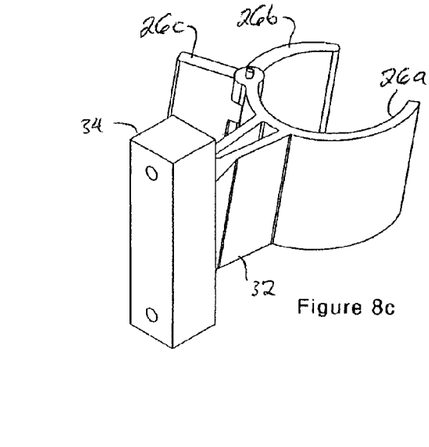
FIG. 8c is the mounting bracket of FIG. 8a, in the open position for holding a medium or large diameter lantern stalk.
Figure 8D:
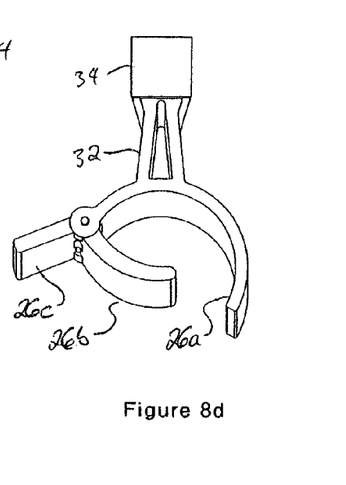
FIG. 8d is, in front perspective view, an alternative embodiment of the mounting bracket of FIG. 8a, in the partially closed position.

In a further embodiment, the distal ends of the mounting bracket tongs each have an outwardly flared flange 12j. A tether 24 for example a ring or loop of material such as for example an o-ring or elastic band may be wrapped around the flanges 12j so as to close over the opening 12e into the tongs 12c and thereby to retain the lantern stalk 10c within the tongs 12c. This is useful to safeguard against the falling of a lantern 10 when the lantern stalk 10c is of the maximum diameter which may be accommodated between the tongs 12c such as for example seen in FIGS. 5-7.

In an alternative embodiment, the mounting bracket is made of materials other than, or in combination with, polyurethane. For example, the tongs on the mounting bracket may be of rigid material such as rigid plastic or metal, and the tongs mounted for spring-biased pivoting relative to one another so that one or both arms of the tongs pivots against the return biasing force of a spring to open the tongs to accept a lantern stalk, and then is biased closed to hold the stalk in the tongs. The shank and base of the mounting bracket may also be made of rigid material. Further alternatively, the arms of the tings may be rigid and the base ends of the arms mounted in a resilient base so that the arms may be pivoted open relative to one another and are biased closed by the resilient base.

Examples of the alternative embodiments, which are not intended to be limiting, are seen in FIGS. 8a-8d and FIGS. 9a, 9b and 9c.

In FIGS. 8a-8d, the tongs 26 have a fixed arm 26a and a hinged arm 26b. Hinged arm 26b may have a protruding trigger 26c. A coiled spring (not shown) is mounted on hinge pin 30, between the hinged and fixed arms. The tongs 26 are mounted on one end of shank 32. Base 34 is mounted on the other end. The arms of tongs 26 adjust against the return biasing force of the spring to hold lantern stalks 10c.

Figure 9A:
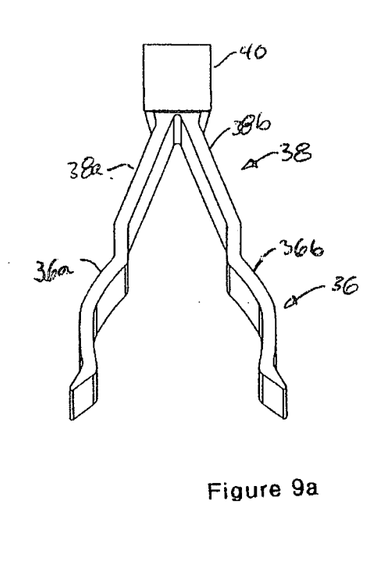
FIG. 9a is, in front perspective view, a further alternative of the mounting bracket with the tongs resilient open wide to clamp a large diameter lantern stalk.
Figures 9B, 9D:
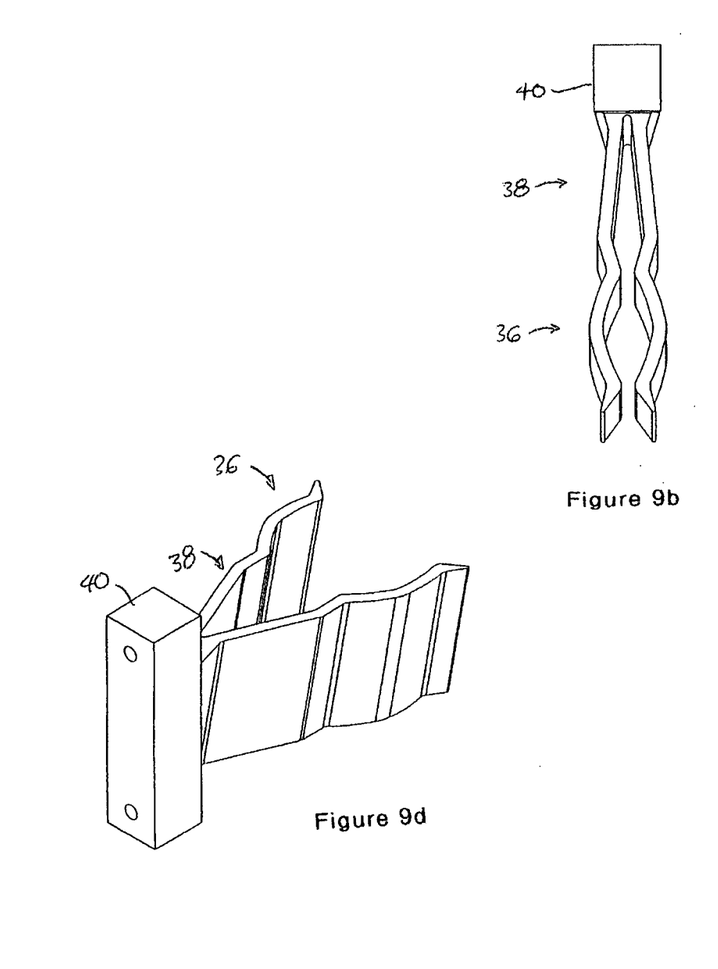
Figure 9C:
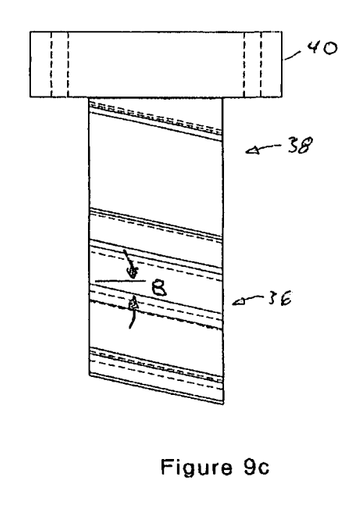
FIG. 9c is, in side elevation view, the mounting bracket of FIG. 9b.

In FIGS. 9a-9d tongs 36 may be rigid or resilient and combined with a rigid or resilient split-shank 38 for example made of more rigid plastic such as from Nylon or fibre-glass-filled Nylon. Each tong arm 36a and 36b are formed as a unitary extension of its corresponding shank half 38a and 38b. The base ends of shank halves 38a and 38b are mounted in a rigid or resilient base 40. The materials are adapted so that the tongs are resiliently biased towards their closed position so as to clamp larger diameter lantern stalks when opened widely as seen in FIG. 9a, and to clamp narrower diameter lantern stalks as seen in FIG. 9b.

As before, in the alternative embodiments, the tongs hold the lantern stalk inclined at angle B.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A system for providing portable hand-held lighting comprising:

A mounting bracket having a base at a base end of said bracket and a pair of resiliently operable tongs at an opposite distal end, distal from said base end, a shank extending between said base and distal ends, wherein said base lies substantially in a base plane and wherein said pair of tongs define a throat having an opening between ends of said pair of tongs wherein said opening opens and closes as said pair of resiliently operable tongs resiliently open and close to expand and contract a cross-sectional area of said throat, and wherein said throat has a bore axis passing substantially centroidally therethrough, said bore axis inclined relative to said base plane, further comprising a solar powered lantern having a solar powered lighting head at an upper end of said lantern and a rigid elongate stalk at a lower end of said lantern, said stalk mounted under said head so as to extend substantially linearly downwardly from said head and wherein said head has a diameter that is greater than a diameter of said stalk, and wherein said diameter of said stalk is substantially in the range of ⅜ inch to one inch, and wherein said stalk has a longitudinal axis extending substantially centroidally along and through said stalk and said head, and wherein said stalk is releasably mountable into said throat through said opening into a mounted position wherein said longitudinal axis is substantially co-linear with said bore axis and wherein said stalk is manually removable from said throat by pulling of said stalk through said opening as said opening said resiliently opens and closes, wherein said base is adapted for mounting to a rigid substantially vertical mounting surface so as to dispose said bore axis upwardly and outwardly inclined from said base plane when said base is mounted to said vertical mounting surface so that said base plane is adjacent and substantially parallel to said vertical mounting surface.

2. The system of claim 1 further comprising a plurality of said mounting brackets and a corresponding plurality of said lanterns, said plurality of said mounting brackets adapted for mounting to said vertical mounting surfaces when said vertical mounting surfaces are chosen from the group of locations comprising: a tree, a post, a pole, a door, a gate, a door frame, a railing, a wall.

3. The system of claim 2 wherein said base's of said plurality of said mounting brackets are adapted for mounting to said vertical mounting surfaces at an elevated location for ease of grasping of said stalks by the user and said pulling of said stalks by the user.

4. The system of claim 3 wherein said pairs of tongs are made of resilient material.

5. The system of claim 4 wherein said material includes 90 A durometer polyurethane.

6. The system of claim 4 wherein said base is made of resilient material.

7. The system of claim 6 wherein said material includes 90 A durometer polyurethane.

8. The system of claim 7 wherein said mounting bracket is entirely made up of said material.

9. A method for providing portable hand-held lighting comprising:
   (a) providing a mounting bracket having a base at a base end of said bracket and a pair of resiliently operable tongs at an opposite distal end, distal from said base end, a shank extending between said base and distal ends, wherein said base lies substantially in a base plane and wherein said pair of tongs define a throat having said opening opens and closes as said pair of resiliently operable tongs resiliently open and close to expand and contract a cross-sectional area of said throat, and wherein said throat has a bore axis passing substantially centroidally therethrough, said bore axis inclined relative to said base plane,
   (b) providing a solar powered lantern having a solar powered lighting head at an upper end of said lantern and a rigid elongate stalk at a lower end of said lantern, said stalk mounted under said head so as to extend substantially linearly downwardly from said head and wherein said head has a diameter that is greater than a diameter of said stalk, and wherein said diameter of said stalk is substantially in the range of ⅜ inch to one inch, and wherein said stalk has a longitudinal axis extending substantially centroidally along and through said stalk and said head,
   (c) releasably mounting said stalk into said throat through said opening into a mounted position wherein said longitudinal axis of said stalk is substantially co-linear with said bore axis of said throat, and wherein said stalk is manually removable from said throat by pulling of said stalk away from said mounting bracket and through said opening in said pair of tongs as said opening said resiliently opens and closes,
   (d) mounting said base to a rigid substantially vertical mounting surface so as to dispose said bore axis upwardly and outwardly said inclined from said base plane and so that said base plane is adjacent and substantially parallel to said vertical mounting surface.

10. The method of claim 9 further comprising providing a plurality of said mounting brackets and a corresponding plurality of said lanterns, and mounting said plurality of said mounting brackets to said vertical mounting surfaces, when chosen from the group of locations comprising: a tree, a post, a pole, a door, a gate, a door frame, a railing, a wall, and wherein said locations are exterior locations chosen to position upper ends of said heads of said plurality of said lanterns so that they are exposed to sunlight on a sunny day.

11. The method of claim 10 further comprising mounting said base's of said plurality of said mounting brackets at elevated said locations for ease of grasping of said stalks by the user and for ease of said pulling of said stalks by the user.

12. The method of claim 11 wherein said pairs of tongs are made of resilient material.

13. The method of claim 12 wherein said material includes 90 A durometer polyurethane.

14. The method of claim 12 wherein said base is made of resilient material.

15. The method of claim 14 wherein said material includes 90 A durometer polyurethane.

16. The method of claim 15 wherein said mounting bracket is entirely made up of said material.

17. The method of claim 9 wherein said inclination of said bore axis is substantially in the range of ten to fifteen degrees from the vertical.

18. The system of claim 1 wherein said inclination of said bore axis is substantially in the range of ten to fifteen degrees from the vertical.

* * * * *